United States Patent [19]

Itagaki

[11] 4,057,496

[45] Nov. 8, 1977

[54] METHOD AND DEVICE FOR FILTRATION

[75] Inventor: Sadayoshi Itagaki, Odawara, Japan

[73] Assignee: Fuji Photo Film Co., Ltd., Minami-Ashigara, Japan

[21] Appl. No.: 696,330

[22] Filed: June 15, 1976

[30] Foreign Application Priority Data

June 17, 1975 Japan .................. 50-73364

[51] Int. Cl.² .................. B01D 37/00; B01D 23/04
[52] U.S. Cl. .................. 210/65; 210/186; 210/307; 210/484
[58] Field of Search .................. 210/65, 71, 184, 186, 210/305, 307, 320, 457, 477, 480, 416, 484

[56] References Cited

U.S. PATENT DOCUMENTS

| 2,274,148 | 2/1942 | Lomax | 210/65 X |
| 2,628,819 | 2/1953 | Parsons | 210/477 X |
| 2,771,194 | 11/1956 | Baxter et al. | 210/65 |

Primary Examiner—Morris O. Wolk
Assistant Examiner—Arnold Turk
Attorney, Agent, or Firm—Sughrue, Rothwell, Mion, Zinn and Macpeak

[57] ABSTRACT

A device for filtering slurries comprises a bag-shaped filter medium accommodated in a filter chamber of a filter tank, in which a slurry is supplied, a baffle plate for separating the filter chamber into a side filter chamber and a bottom filter chamber, said side and bottom filter chambers each having an outlet port which can be freely opened and shut, the upper end of said baffle plate being located above the upper surface of a filter cake sedimented on the bottom of the bag-shaped filter medium and a method of filtration by means of the device.

10 Claims, 1 Drawing Figure

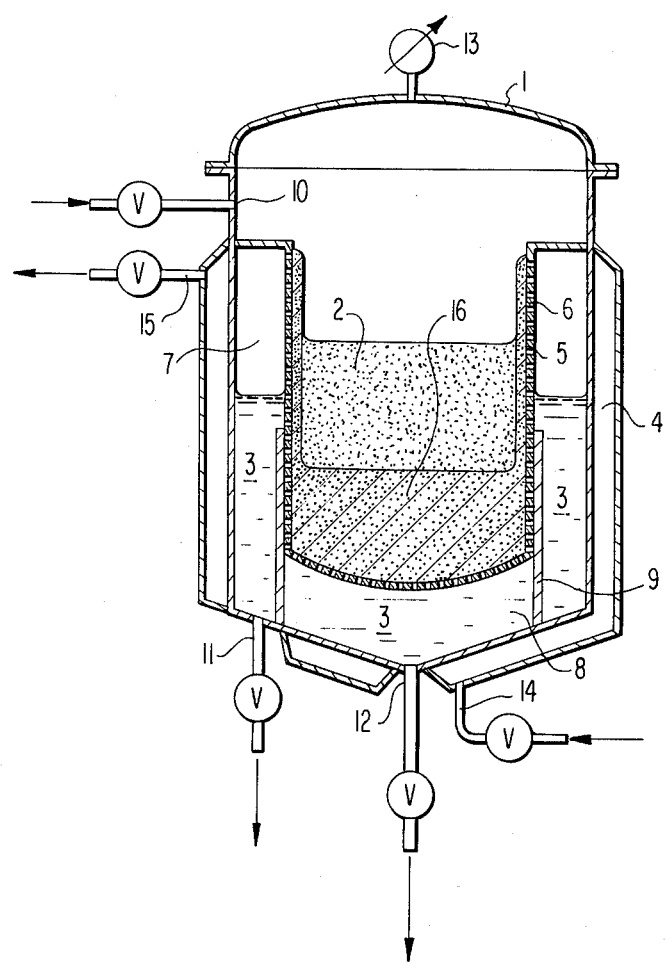

METHOD AND DEVICE FOR FILTRATION

BACKGROUND OF THE INVENTION

This invention relates to a method and device for filtering slurries, and more particularly to a method and a device for filtering slurries by means of a semibatch operation.

In case of filtering used iron oxide in a reactant liquid obtained by a reducing reaction in which iron borings are used as a reducing agent, the filtration of slurries is sometimes required. Some prior methods of filtration which have been employed are: the Nutsche process, the filter press process, the leaf filtration process and the horizontal plate pressure filtration process, etc. However, these processes have been unsatisfactory because the filter cake produced by the filtration is difficult to dispose of; much labor and time are required for disassembly, cleaning and reassembly of the filter; and it is impossible to dispose of the slurry remaining in the filter.

In the light of such circumstances, a method of filtration was developed and put into practical use which comprises the steps of supplying a slurry into a bag-shaped filter medium accommodated in a jacketed tank, filtering the slurry by applying a pressure to it or reducing the pressure outside the bag, supplying a gas under pressure to dispose of the remaining slurry in the filter medium thereby reducing further the liquid content of the filter cake, and then drawing up the bag-shaped filter medium to take out the filter cake. However, the abovementioned method of filtration by using a bag-shaped filter medium is disadvantageous from the viewpoint of its operational efficiency. When a gas is supplied under pressure into the filter medium to dispose of the remaining slurry and reduce further the liquid content of the filter cake, the pressurized gas tends to find its way outside the filter medium by short-circuiting through the side part thereof. This is due to small resistance of filtration on the sides since the slurry tends to remain on the bottom of the bag-shaped filter medium. As a consequence it becomes impossible to dispose of the residual slurry and to reduce the liquid content of the filter cake, thereby making removal of the raw liquid and withdrawal of the cake extremely difficult.

SUMMARY OF THE INVENTION

Therefore, an object of the present invention is to provide a method of filtration for completely filtering the slurry, and a device for carrying out the method.

Another object of the present invention is to provide a method of filtration which enables a filter cake with a small liquid content to be produced and a device for carrying out the method.

A further object of the present invention is to provide a method of filtration which enables filter cake formed by the filtration to be handled easily, and a device for putting the method into practice.

The above-mentioned objects of the present invention can be accomplished by separating a filtration chamber into a side filter portion and a bottom filter portion by a baffle plate and locating the upper end of the baffle plate above the upper surface of a filter cake accumulated or sedimented at the bottom of a bag-shaped filter medium.

BRIEF DESCRIPTION OF THE DRAWING

The only FIGURE is a schematic view of a filter according to one preferred embodiment of the present invention.

DETAILED DESCRIPTION

In the FIGURE. reference numeral 1 denotes a filter tank, 2 a slurry to be filtered, 3 a filtrate, 4 a jacket adapted to control the temperature of the slurry or the filtrate inside the filter tank, and 5 a bag-shaped filter medium. Reference numeral 6 represents a filter plate, 7 a side filter chamber, 8 a bottom filter chamber, 9 baffle plate for separating the filter chamber into two parts or a side filter chamber 7 and a bottom filter chamber 8, and 10 an inlet port through which the slurry 2 is supplied into the filter tank 1. Reference numeral 11 denotes an outlet port of the side filter chamber through which the filtrate 3 is exhausted, 12 an outlet port of the bottom filter chamber through which the filtrate 3 is exhausted, 13 a pressure gauge for measuring the pressure inside the filter tank 1, 14 an inlet port through which a heat medium or refrigerant is supplied into the jacket, 15 an outlet through which the heat medium or refrigerant is taken out, and 16 a filter cake.

The slurry 2 to be filtered is supplied under pressure through the inlet port 10 into the filter tank 1. Pressure is supplied to increase the filtration speed. Suitable methods of applying pressure to the slurry are well known. The pressure to the slurry can be supplied by means of a pump or by supplying a gas under pressure into the tank in which the slurry is stored. Other well-known pressurizing methods will also suffice. The pressure in the filter tank 1 can be detected by the pressure gauge 13, and the amount of the slurry 2 to be supplied is controlled so that the filtration pressure may be maintained at a desired value. A suitable filtration pressure depends on the kind of slurry to be filtered, and required filtration speed, etc., and therefore no single pressure can be stated as being optimum for all conditions. It is preferable, however, to keep the filtration pressure below 10 kg/cm$^2$ in general, and below 2 to 3 kg/cm$^2$ in particular, taking into account the mechanical strength of the filter tank 1 and the filter medium 5, etc.

A heat medium or refrigerant is supplied through the inlet 14 into the jacket to control the temperature of the slurry 2 or the filtrate 3 so that crystallization, excessive increase in viscosity and decomposition etc, can be prevented. The slurry 2 is filtered in both the side filter chamber 7 and the bottom filter chamber 8. The filter chamber is separated by a baffle plate 9 into the side filter chamber 7 and the bottom filter chamber 8. Further, the filter medium 5 should be made of a flexible material which can tightly adhere to the filter plate 6 and the baffle plate 9 and should have a chemical stability that can prevent a remarkable increase in resistance of filtration due to particles bridging in the fine holes thereof even when a considerable time has elapsed after the commencement of filtration. As for the filter medium 5 to meet such requirements fibrous materials are preferred. In particular, synthetic fibers such as nylon, polyvinyl chloride, vinyl chloride-vinylidene chloride copolymer, polyester, and polyacryl, etc., and natural fibers such as cotton and gossypium etc, are desirable. Further, the filter plate 6 should be chemically stable and have a sufficient number of fine holes which permit the passage of the filtrate 3 and also have a mechanical strength enough to withstand the filtration pressure. The size of the fine holes depends on the kind of slurry to be filtered and the filtration speed etc, and no single optimum size can be given for all cases. It is preferable to use a plate 6 having fine holes of a diameter between 0.2 to 3 cm, preferably 0.3-1 cm, and more preferably 0.4 to 0.6 cm.

The baffle plate 9 should be corrosion resistant and have sufficient mechanical strength to resist the filtration pressure.

The sedimentation which forms the filter cake 16 on the bottom and side walls tends to resist filtration. However, filter cake 16 will sediment mostly on the bottom of the bag-shaped filter medium 5 so that the amount of the filter cake which sediments on the side filter chamber will decrease. As a result, the filtration resistance in the side filter chamber is reduced to that the filtration of slurry at a high speed can be accomplished.

Upon completion of such filtration, the outlet port 11 of the side filter chamber 7 is closed and the outlet port 12 of the bottom filter chamber 8 is opened and a gas under pressure is supplied through the slurry feeding port 10 into the filter tank 1 so that the slurry 2 remaining in the filter medium 5 can be filtered further thereby reducing the liquid content of the filter cake 16. In this case, the upper end of the baffle plate 9 should be located above the top surface of the filter cake 16. If the upper end of the baffle plate 9 is located below the upper surface of the filter cake 16, the gas under pressure tends to flow into the side filter chamber 7 and then back through a lower portion only of the filter cake 16 to the outlet port 12 of the bottom filter chamber so that it becomes extremely difficult to effect efficient filtration of the remaining slurry 2. Since the amount of accumulation of the filter cake is easily predictable, the position of the baffle plate can be easily set. In this case, an ample safety allowance can be taken if the position of the baffle plate is predetermined to be at the top level of the filter cake on the assumption that all of the filter cake will sediment on the bottom of the filter medium 5. Due to the separation of the filter chamber into two parts by means of the baffle plate 9 and by shutting the outlet port 11 of the side filter chamber and supplying a gas under pressure through the inlet port 10 into the filter tank, the liquid content of the filter cake 16 can be substantially reduced. Therefore, the filter cake thus formed can be handled extremely easily. The pressure of the gas applied in this case is the same as the value previously mentioned with regard to the slurry 2.

Any types of gases under pressure can be used for the purpose, provided that they do not react with slurries to be filtered. From the viewpoint of safe operations, nitrogen, carbon dioxide and rare gases etc, are preferable. Further, taking into consideration the economy, nitrogen is most desirable.

Subsequently, a cleaning solution is supplied through the slurry feeding port 10 for slurry into the filter tank 1 to wash the filter cake 16. In this case, when it is desired to wash the filter cake 16 which sediments on the side filter, the cleaning solution is supplied into the filter tank after the outlet port 11 of the side filter is opened and the outlet port 12 of the bottom filter is closed. Whilst, when it is required to wash the filter cake 16 sedimenting on the bottom of the filter medium, the outlet port 12 is opened and outlet port 11 is closed, and then the cleaning solution is supplied into the filter tank.

Upon completion of the above-mentioned washing of the filter cake 16, a lid for the filter tank 1 is opened, and then the bag-shaped filter medium 5 is drawn up to take out the filter cake 16. Since the filter cake 16 can thus be taken out by drawing up the filter medium 5, the filter cake can be handled very easily.

It is to be noted that the present invention is not limited to the above-mentioned embodiment, and various modifications and changes can be made by those skilled in the art without departing from the scope or spirit of the present invention. In the above-mentioned embodiment, the slurry 2 is supplied under pressure, however, the filtration rate can be increased by reducing the pressure on the exhaust side of the filter tank 1 below the pressure in the latter without applying a pressure to the slurry 2. Moreover, in the above-mentioned embodiment, after the completion of filtration a gas is supplied under pressure again into the filter tank 1. As an alternative, the liquid content of the filter cake 16 can be reduced by reducing the pressure outside the outlet port 12 of the bottom filter. It should be noted that it is not always necessary to supply a gas under pressure in order to reduce the liquid content of the filter cake 16 even if the slurry 2 is supplied under pressure.

In accordance with the present invention, the slurry remaining in the filter tank can be completely filtered, and therefore a cake with a small liquid content can be obtained so that the filter cake can be disposed of extremely easily.

In order to have better understanding of the effect of the present invention, a comparative example and an example of an embodiment of the invention will be given below.

COMPARATIVE EXAMPLE

A filtration of a slurry having composition as shown in Table 1 was conducted by means of a filter device of FIG. 1 without the baffle plate 9. As for the filter tank, a stainless steel cylindrical tank of 400 mm inside diameter and 660 mm height was employed. As for the filter plate 6, a stainless steel plate of 3 mm thick with small holes of 5 mm diameter was used. Further, nylon fiber was used for the filter medium 5. Other conditions of filtration are as shown in Table 2.

TABLE I

| | |
|---|---|
| Iron oxide | 9.0 kg |
| Active Carbon | 0.75 kg |
| Isopropyl alcohol | 80 l |
| Water | 6.6 l |

TABLE 2

| | |
|---|---|
| Filtration area | 0.24 m² |
| Filtration pressure | 0.5 kg/cm² (gauge press) |
| Filtration time | 30 min. |

After the completion of the filtration, nitrogen gas was supplied for 5 minutes at a gauge pressure of 0.5 kg/cm² through the inlet port for slurry to dispose of the remaining slurry.

The result of the latter procedure was that 22 liters of slurry remained on the filter cake, consequently complete filtration of the slurry was not accomplished.

EXAMPLE OF EMBODIMENT

A filtration was conducted by means of the same filter device as the comparative example except that a stainless steel baffle plate 9 of 3 mm thick as shown in FIG.

1 was mounted therein. The composition of the slurry and the conditions of filtration were entirely the same as those of the comparative example.

After the completion of the filtration, nitrogen gas was supplied for 5 min. at a gauge pressure of 0.5 kg/cm$^2$ through the inlet port for slurry to dispose of the remaining slurry.

The result of the procedure was that all the slurry was disposed of (none remaining on the filter cake), and the resulting liquid content of the filter cake was 30% (based on the dried filter cake). This represents a remarkable improvement over the comparative example.

While the invention has been described in detail and with reference to specific embodiments thereof, it will be apparent to one skilled in the art that various changes and modification can be made therein without departing from the spirit and scope thereof.

What is claimed is:

1. A method of filtering slurries to obtain a filtrate and a sedimented filter cake, comprising,
    a. supplying a slurry to a bag-shaped filter medium within a filter tank,
    b. forcing the liquid from said slurry to enter a bottom filter chamber and a side filter chamber, separated from one another by a baffle extending slightly higher than the expected height of the sedimented filter cake on the bottom of said bag-shaped filter medium, to leave a sedimentation of filter cake on the bottom and side walls of said bag-shaped filter medium,
    c. said bottom and side filter chambers having exit ports for the removal of filtrate therefrom, and (d) subsequent to the forcing of the liquid, applying a pressure differential on opposite sides of said bag-shaped filter medium while simultaneously having closed all exit ports of said side filter chamber and having the exit port of said bottom filter chamber open, whereby said pressure differential draws liquid from said filter cake on the bottom of said medium.

2. The method of claim 1 wherein the step of forcing comprises,
    a. applying a pressure differential on opposite sides of said bag-shaped filter medium during the supplying of slurry to cause filtrate to concurrently enter the side and bottom chambers and concurrently leave a sedimentation of filter cake on the bottom and sides of said bag-shaped filter medium.

3. The method of claim 2 wherein the step of applying a pressure differential subsequent to the supplying of slurry comprises supplying a gas, of a type which will not react with the slurry, under pressure to the inner part of said bag-filter medium.

4. The method of claim 3 wherein said gas is supplied at a pressure below 10 kg/cm$^2$.

5. The method of claim 2 further comprising the subsequent step of supplying a filter cake cleaning solution to the inner portion of said bag-shaped filter medium and, at the same time opening the exit port of only one of said filter chambers while closing the exit port of the other of said filter chambers followed by reversing the opening and closing states of the exit ports of the respective filter chambers.

6. The method of claim 5 further comprising, after the step of supplying a cleaning solution, removing said bag-shaped filter medium with the filter cake therein from said filter tank.

7. Apparatus for filtering slurries comprising,
    a. a filter tank,
    b. filter medium holding means positioned in said tank for holding a bag-shaped filter medium in said tank above the bottom of said tank and separated from the walls of said tank,
    c. a slurry inlet on said tank for introducing a slurry therein at a position which will result in said slurry being supplied to the inner portion of said bag-shaped filter medium,
    d. a baffle, located within said tank on the filtrate side of said bag-shaped filter medium, separating the portion of said tank which will receive the filtrate through the filter medium into a side filter chamber and a bottom filter chamber, said baffle extending to a predetermined height which is slightly above the expected height of the filter cake, and
    e. separate exit ports for the side filter chamber and the bottom filter chamber, said exit ports being freely openable and closeable.

8. Apparatus as claimed in claim 7 further comprising said bag-shaped filter medium being positioned on said holding means.

9. Apparatus as claimed in claim 8 wherein said bag-shaped filter medium is a fibrous material.

10. Apparatus as claimed in claim 7 wherein said filter tank further comprises a heat control jacket around at least a portion of the outside of said filter tank wall and bottom.

* * * * *